June 13, 1967     M. H. SMITH ETAL     3,324,727
DIAPHRAGM-TYPE HIGH PRESSURE TRANSDUCER
Filed March 10, 1965
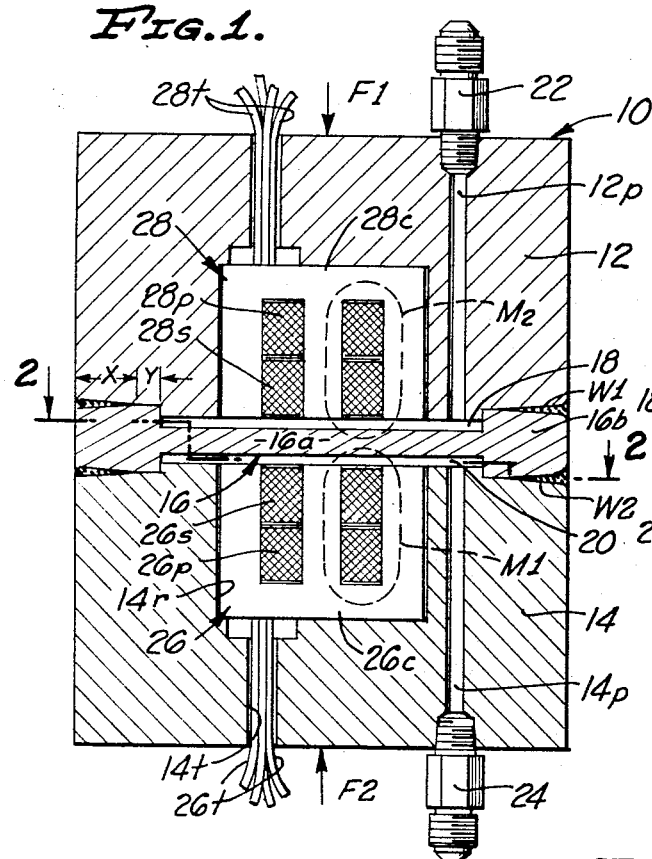
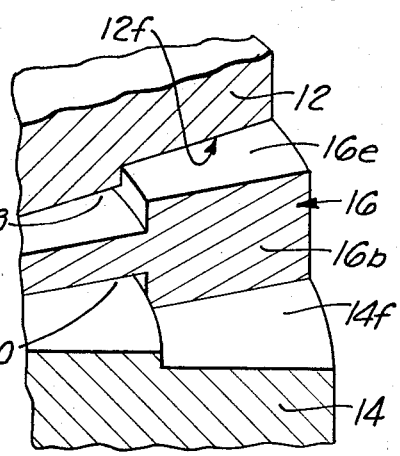
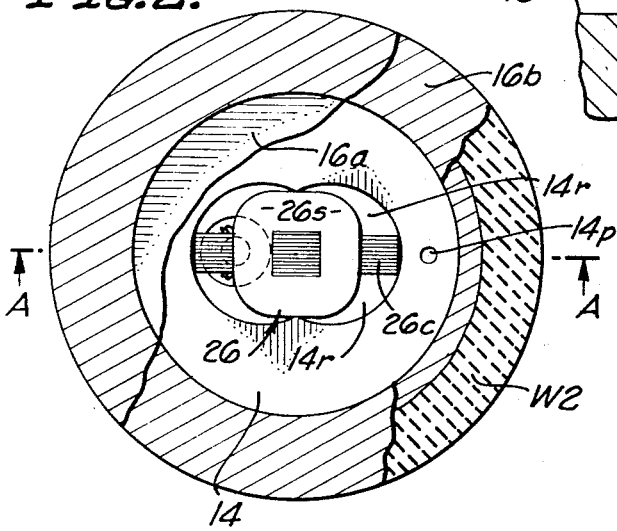
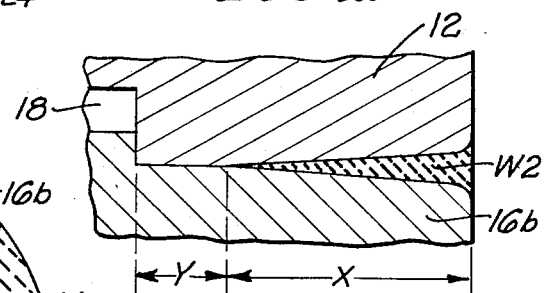
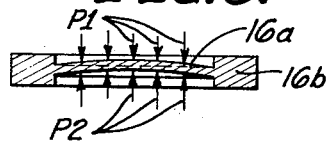
INVENTORS
MELVIN H. SMITH,
KENNETH F. MILLER 3,324,727
DIAPHRAGM-TYPE HIGH PRESSURE
TRANSDUCER
Melvin H. Smith, Perris, and Kenneth F. Miller, Riverside, Calif., assignors to Bourns, Inc.
Filed Mar. 10, 1965, Ser. No. 438,584
4 Claims. (Cl. 73—398)

ABSTRACT OF THE DISCLOSURE

A pressure transducer comprising a diaphragm device having an elastic central portion arranged to be subjected to the influence of a fluid under pressure and having a rim portion encircling the elastic central portion, which rim portion is compressively loaded to an extent in excess of the maximum load to be applied to the elastic central portion of the diaphragm whereby radial movement of said rim portion is prevented and transduction of changes of pressure to which the elastic central portion of the diaphragm device may be subjected is accomplished without linearity error attributable to radial movement in said rim portion of said diaphragm device.

---

The invention herein disclosed pertains to pressure transducers of the type utilizing a thick resilient diaphragm as a pressure-sensitive device or sensor the deflections of which under the influence of pressure-differentials between fluids admitted thereto are utilized to change physical relationships of auxiliary devices to produce signals representative of the respective pressure differentials. More particularly, the invention relates to improvements in diaphragm devices and methods of incorporating the diaphragm devices in transducers and to improvements in transducers utilizing the improved devices.

As is known, pressure transducers of the type here of interest are characterized by two types of errors in the translation of pressure differentials into equivalent signals. One type of error is characterized by departure from a linear relationship between pressure difference sensed by the diaphragm and the output signal representing that difference. The error has been termed "linearity error." Another type of error is evidenced by the output signals produced during increase of pressure differential being different from those produced, at respective pressures as the pressure differential is decreasing, all the sensing operations occurring within the rating of the instrument. The latter type of error has been termed "hysteresis error," being the result of the absorption of energy in the transducer during flexing of the diaphragm.

Further, it is known that undesirable relative movements between active components of the transducer contribute to the first type of error; that is, that they tend to widen the error band of the transducer. For example, inward slipping or migration of the outer rim portion of the diaphragm relative to the supporting structure, incident to pressure-induced axial flexure of the diaphragm, contributes to nonlinearity of the pressure-differential/output signal of the instrument and hence is undesirable. Such inward slipping or migration of the outer generally annular portion of the diaphragm has been to some extent restricted in instances by various expedients. For example, in one class of transducers the diaphragm has been disposed between opposing faces of first and second body members and the outer peripheral edge portion of the diaphragm welded to adjacent portions of the body members. Such practices, while reducing the noted error to various extents, have not eliminated the error or reduced it to a degree at which it is of no significance, and further have been much less effective in the case of high-pressure instruments than in those instruments adapted for use in the lower pressure ranges. As is evident to those skilled in the art, when a diaphragm disposed between two opposed members to which it is welded around its outer edge is subjected to pressure exerted by an admitted fluid, that pressure also is exerted throughout the diaphragm chamber and hence upon the adjacent body member, and thus produces a force tending to move the body member away from the diaphragm. Thus the outer annular portion of the diaphragm that is gripped between the body members is permitted to stretch and creep or migrate inwardly.

According to the present invention, inward creep or migration of the diaphragm incident to pressure-induced bowing or deformation of that member, is precluded in part by a novel structural combination and in part as a result of using a new technique in assembling the principal components of the transducer. To those ends the elastic diaphragm is provided as the central portion of a diaphragm device, the encircling outer portion or rim of which is preferably considerably thicker or stronger than the center portion, and the inner portion of the rim is gripped and held by the body members under compressive forces of magnitude in excess of the maximum expected fluid-exerted force tending to separate the body member and diaphragm. That is, an inner portion of the rim of the diaphragm device is frictionally gripped by the body members with a force so great that the diaphragm, even if otherwise free to move, is frictionally prevented from inward creeping. Further, according to the invention, an outer annular part of the rim of the diaphragm device is fused with an adjacent annular portion of each of the body members while the three components are being forced together by a press or like means, whereby when the assembled transducer components are removed from the press, the fused-together outer portions of the diaphragm device and body members are placed under tensile stress and thus maintain the inner annular portion of the rim of the diaphragm member under high compressive stress. Additionally, the annular rim portion of the diaphragm device may be made with a pair of peripheral shoulders which bear radially against respective annular portions of the opposed body members and thus the rim portion may be further buttressed against inward migration when the diaphragm proper is elastically deformed by the forces exerted by fluid pressure differential.

The preceding brief general description of the invention makes it evident that it is a principal object of the invention to provide improvements in a pressure transducer employing a diaphragm as a pressure-sensitive element.

It is another object of the invention to provide a pressure transducer of the diaphragm type characterized by improved accuracy.

Another object of the invention is to provide improvements in methods of constructing diaphragm-type pressure transducers.

Other objects and advantages of the invention will hereinafter be stated in the appended claims or made evident in the following description of a preferred exemplary form of transducer made according to the invention, that transducer being illustrated in the accompanying drawings in which:

FIGURE 1 is a vertical sectional view taken on a plane which includes the longitudinal axis of the transducer, the view being along a plane and in a direction indicated by the broken line A—A in FIGURE 2, the scale being arbitrary and certain features being exaggerated to facilitate illustration;

FIGURE 2 is a transverse sectional view of the preferred exemplary transducer taken at various levels and in a direction generally indicated by broken line 2—2 of FIGURE 1;

FIGURE 3 is an enlarged fragmentary pictorial view illustrating a detail of the relationship of three principal components of the preferred exemplary transducer during an assembly procedure;

FIGURE 4 is a fragmentary view in section of a portion of the preferred exemplary transducer, illustrating a detail of construction; and FIGURE 5 is a reduced sectional view useful in explaining deformation or flexing of a diaphragm.

Referring to the drawings, the preferred exemplary transducer is designated generally by ordinal 10. As principal components the transducer includes first and second generally cylindrical rigid block-like metal body members 12 and 14 and a diaphragm device 16. The body members may be substantially alike or identical, and the relationships of either to the other and to the diaphragm device are likewise preferably substantially alike; hence descriptions of details will largely be limited to one of the body members in the interest of conciseness. The body members and the diaphragm device are preferably of stainless steel.

The diaphragm device 16 comprises a resilient paramagnetic central portion 16a herein termed the diaphragm, which is encircled by and made integral with a rigid generally annular rim 16b. Preferably, and as illustrated, the rim 16b is thicker than the diaphragm 16a and is preferably connected to the latter in a symmetrical configuration. The rim thus presents an outer generally cylindrical surface and two end faces such as 16e which end faces preferably but not necessarily are planar and parallel (FIGURE 3).

The body members 12 and 14 are formed to provide respective annular faces 12f and 14f that are dimensioned and formed to closely fit and mate with respective ones of the annular faces of rim 16b of the diaphragm device, whereby the three principal named components of the transducer may be brought into close-fitting juxtaposition as illustrated in FIGURES 1 and 3 and subjected to high axial compressive forces. Further the body members and the diaphragm device are so formed or shaped that there is provided space in which elastic flexing or deforming of the diaphragm 16a under the influence of applied pressure can take place. Thus by appropriately shaping the body members there are provided first and second chambers 18 and 20, respectively (FIGURES 1 and 3), into which fluid under pressure may be admitted. In the case wherein the rim portion 16b of the diaphragm device is not thicker than the diaphragm 16a, the body members will be appropriately recessed to provide the necessary spaces or chambers for admission of fluid and to permit elastic flexing of the diaphragm.

Fluid under pressure may be admitted to chambers 18 and 20 by way of passages provided for the purpose. As is made evident in FIGURE 1, fluid may be admitted to and exhausted from chamber 18 by way of a bore or passage 12p; and similarly fluid may be admitted to and exhausted from chamber 20 by way of a bore or passage 14p. The respective passages may be made to communicate with appropriate bodies of fluid under respective pressures whose differential is the subject of investigation, by means of fluid fittings, such as fittings 22, 24, to which communicating conduits may be connected in known manner. The chambers are made fluid-tight, except for the noted fluid-entry passages 12p and 14p, by means and in a manner presently explained.

Means for transforming or translating elastic deformations or deflections of diaphragm 16a into useful signals representing the difference between the pressure exhibited by the fluids admitted to chambers 18 and 20 are provided. While other equivalent means for the noted translation may be employed, preferably and as illustrated, inductive electromagnetic means are employed. The depicted electromagnetic means utilize changes in the reluctance of a magnetic circuit or path in which at least a portion of the diaphragm is disposed to move in response to change in pressure differential, to produce equivalent changes in the interaction between an excited primary coil and a secondary coil or winding. Thus there is disposed in a recess 14r (FIGURE 2) formed in body member 14, an inductive magnetic assembly or unit 26 that comprises a laminated E-core 26c, a primary winding or coil 26p and a secondary winding or coil 26s, all arranged and disposed as shown and with the planar surfaces of the three limbs of the core coplanar with the adjacent face of the body member. Insulated electrical leads 26t connected to respective ends of the two coils extend therefrom to the exterior of the transducer by way of a passage or bore 14t. The inductive unit and the electrical leads are "potted" or embedded and sealed in the recess 14r and passage 14t in a manner and by means well known in the electronic systems art. The embedding compound has not been physically depicted on the drawing, in the interest of clarity of illustration; and it is noted that the compound must be prevented from interfering with elastic flexing of the diaphragm.

Preferably, and as illustrated, the second body member, 12, is provided with a magnetic assembly or unit, which may be substantially identical to unit 26. As depicted in FIGURE 1, body member 12 is provided with a cavity or recess similar to recess 14r, and a passage similar to passage 14t. In the recess and passage are disposed magnetic unit 28 comprising E-core 28c, primary 28p, secondary 28s, and leads 28t, all constructed and arranged in a manner now evident and adapted to be disposed in opposition to unit 26.

Following construction of the previously described principal components including the diaphragm device and the body members with embedded magnetic units, the body members 12 and 14 are brought into juxtaposition with diaphragm device 16 therebetween. It may be noted that close fitting of the two sets of annular surfaces, such as 12f and 16e, may be improved by known techniques including grinding and lapping. With the parts in juxtaposition as indicated, the transducer assembly is placed in a press or the like and subjected to compressive forces applied at the opposite ends of the assembly and herein indicated by F1 and F2. The latter forces, which preferably are distributed over considerable portions of the areas of the respective ends of the body members, are such as to considerably exceed the maximum expected internal forces that may be exerted by fluids under pressure in chambers 18 and 20 and which internal forces tend to force the body members apart. Thus the forces F1 and F2 applied by the pressure or like means place the contacting faces of the diaphragm device and body members under high compressive stress.

With the assembled components held in compression by the forces F1 and F2, body member 12 is welded to the diaphragm rim as indicated by weld W1, and body member 14 is similarly fusion-united to the diaphragm rim by weld W2. The welds are preferably annular, that is, they preferably extend completely around the peripheries of the respective junctures. Further, the welds extend inwardly to a considerable distance, as indicated by X in FIGURE 1. However, an annular area of contact, of width Y (FIGURE 1), is left free of the weld but under compressive stress. The welds are preferably but not necessarily made or effected by utilizing electron-beam welding techniques, and are made deep enough to insure that the welds will not part under tensile forces to which they will become subjected. As is evident, if the welds are each continuous, i.e., annular, they will provide fluid-tight junctures around respective chambers 18 and 20.

Following completion of the welds W1 and W2 the assembled transducer 10 is released from the press and forces F1 and F2. During release from the forces F1 and F2, the welds are brought under tensile stress by the compressive stress existing in the remainder of the annular contacting surfaces such as 12f and 16e; and thus the tension in the welds maintains the inner annular area of width Y under great compressive stress. As is evident, the relationship between width X and width Y of the annular areas is different for different metals or alloys of which the components may be made. The total width of the contacting annular faces such as 16e must be such that safe tensile stresses in the weld area may maintain the unwelded portion of the faces under compressive forces considerably in excess of oppositely-directed forces that may be applied or exerted by fluid under pressure in one or both of chambers 18 and 20. Thus even when fluids under the maximum pressure permitted by the rating of the transducer are admitted to respective ones of chambers 18 and 20, the unwelded generally annular portions of the contacting faces of the diaphragm rim and of the body members remain compressively forced together by the tension in the respective welds W1 and W2. Hence the diaphragm at all times is frictionally gripped and held against radial inward creeping, and the diaphragm flexing is substantially linear with respect to the pressure differential.

When the pressures exhibited by fluids admitted to respective ones of chambers 18 and 20 are different, the forces exerted by the fluids upon the diaphragm 16a are unbalanced, and the diaphragm flexes or elastically deforms. That is illustrated in FIGURE 5, wherein the larger forces exerted on the diaphragm by a fluid under higher pressure (P2) distort or flex the diaphragm upwardly against the lesser forces exerted by the fluid under lower pressure (P1). Referring to FIGURE 1, when the pressures, and hence the forces, are equal and the diaphragm is not flexed, the magnetic circuit M1 of unit 26, or the magnetic circuit M2 of unit 26, or both, may be considered to be in a null state. As the diaphragm flexes, the magnetic circuit (or both when both units are used) is varied due to increase or decrease of the air gap between the diaphragm and the adjacent faces of the limbs of the magnetic core. For example, when the pressure exhibited by the fluid admitted to chamber 20 exceeds that of the fluid in chamber 18 and the diaphragm flexes as indicated in FIGURE 5, the magnetic circuit M1 is lengthened (and circuit M2 is shortened); whereby the potential induced in secondary 26s in response to energization of primary 26p decreases (and that induced in secondary 28s increases). Thus when the secondary means (one or both of the secondary coils) is connected in a bridge network in known manner, a secondary signal representative of the pressure differential causes a bridge unbalance similarly representative of that pressure differential. The operation and construction of the magnetic units 26 and 28 and the associated bridge circuitry (not shown) are known in the transducer art and hence will not here be further described. Reference to texts and like published works in the art may be referred to for details if necessary, it being understood that a full-bridge network is used if both of magnetic units 26 and 28 are incorporated in the transducer, and a half-bridge network is used in cases where only one magnetic unit is incorporated.

The preceding description makes it evident that due to the construction and mode of assembly of the transducer the diaphragm is securely maintained against inward radial slipping during flexing and hence is restricted to elastic flexing and return, whereby the accuracy of the transducer is superior to that of transducers in which such radial movement of the peripheral portion of the diaphragm can occur. Also it is evident that by utilizing the simple structural arrangement of the three principal components the necessity for a housing to enclose and maintain parts in proper operating juxtaposition is avoided. Inward migration or creeping of the diaphragm is obviated by maintaining an annular portion of the diaphragm device next-adjacent to and encircling the diaphragm under frictional gripping effort at all times. The compressive frictional gripping effort is maintained by tensional stress created and maintained in the annular weld by which the diaphragm rim is sealed and secured to the respective body member.

It should be noted that for purposes of illustrating the preferred form of transducer in the drawings, some parts and dimensions are therein exaggerated and are not shown to scale. For example, in a transducer of the cylindrical configuration depicted and of one-inch outside diameter with diaphragm and body members of stainless steel, the gap between the diaphragm and the faces of the E-core or cores may be of the order of $1 \times 10^{-3}$ inch and the diaphragm may be of the order of from one mil to ten mils thick, depending upon the maximum pressure differential to be accommodated. Also, the diaphragm deflection shown in FIGURE 5 is grossly exaggerated, and in an instrument of the noted dimensions would be of the order of less than one mil.

The preceding description of an exemplary preferred transducer structure and the mode of making the same makes it evident that the aforementioned objects of the invention have been fully attained. In the light of the description or disclosure, changes within the true spirit and scope of the invention will occur to those skilled in the art, and hence it is desired that the invention be not limited to specific details of the exemplary preferred form illustrated, but rather that the scope of the invention be defined by the appended claims.

We claim:

1. A pressure transducer of the diaphragm-type adapted for accurate translation of difference of pressures exhibited at opposite faces of a diaphragm, said transducer comprising:

first means, including fusion-united means at least a portion of which is under high tensile stress and another portion of which is under high compression stress, said portion under high compression stress including at least inner annular portions of first and second rigid block-like body members having opposed faces presenting respective generally annular flat surfaces each encircling a central portion thereof, and said body members each having provisions including a respective passage for passing fluid under pressure therethrough to the said central portion of face the respective thereof, and the fusion-union in said first means including fused metal under high tensile stress, second means, including a diaphragm device having an annular rim portion presenting a generally flat annular face complementary to and in intimate contact with the said generally annular flat surfaces of said body members and held therebetween against all movement therebetween under high compressive strain, and said diaphragm device having an elastic thin central portion encircled by and integral with said rim portion and complementing said central portions of the said body members to therewith form enclosed chambers in communication with respective ones of said passages whereby fluids under pressure may be admitted to respective ones of said chambers and elastically flex said central portion of said diaphragm and create opposing forces on said diaphragm device and said body members tending to separate said diaphragm and said body members; and third means, including means responsive to elastic flexing of said central portion of said diaphragm device to produce a signal representative of the extent of the flexing;

said first means including means maintaining the said complementary generally annular faces of said body members and said annular face of said rim portion of said diaphragm device together in intimate contact under high compressive strain under forces in excess of the maximum value of said opposing forces tending to separate said diaphragm and said body member, whereby all radial movement of the annular portion of said diaphragm device encircling the elastic thin central portion thereof is prevented and whereby linearity error attributable to such movement is obviated.

2. A pressure transducer according to claim 1, said first means comprising means fusion-uniting said body members to said diaphragm at the outer peripheries of the mating complementary annular faces thereof, said outer peripheries of said first and second body members being under high tensile stress adjacent said fusion-uniting means and being under high compression stress inwardly of the fusion-united outer peripheries.

3. A pressure transducer according to claim 1, said third means comprising an electromagnetic unit disposed in at least one of said body members and composed essentially of ferromagnetic core means so disposed relative to said elastic central portion of said diaphragm device as to include said elastic central portion in the magnetic circuit of said core means, and primary and secondary inductive winding means in inductive relation to said core means and having electrical leads extending to the exterior of said body member.

4. A pressure transducer, comprising:
first means, including first and second rigid body members of generally cylindrical configuration, each of said body members having a respective shaped end face and said end faces being disposed in opposed relation but spaced apart and said faces each including a generally annular flat surface encircling an inner portion of the respective face, and each of said body members having a respective recess encircled by said generally annular flat surface and said body members further having provisions including respective passages for admission of respective fluids from the exteriors thereof to said inner portions of said faces thereof;
second means, including a diaphragm device interposed between the said end faces of said body members, said diaphragm device having first and second opposite faces and having a generally circular elastic paramagnetic central portion and a generally annular rim portion encircling said central portion, said annular rim portion having first and second annular flat surfaces each mating with and complementary with a respective one of said flat annular surfaces of said body members, at least an inner portion of the respective mating surfaces of said diaphragm device and said body members being under high compressive stresses producing a compressive load in excess of the maximum load to be exerted on said elastic central portion of said diaphragm device whereby to prevent radial migration of any of said rim portion of said diaphragm device relative to the mating surface of either of said body members and whereby an annular portion of said diaphragm is gripped by and between said body members and therebetween held against movement relative to said body members, and each of said body members being fusion-united with an outer annular portion of said rim portion of said diaphragm device within a generally annular region immediately adjacent to and encircling a respective one of said annular flat mating surfaces, the regions of fusion-union of said body members and said diaphragm device being under respective high tensile stresses whereby to maintain said high compressive stresses at said annular mating surfaces, and whereby respective fluid-tight junctures are formed between said rim portion of said diaphragm device and said body members,
said body members and said diaphragm device being configured to provide first and second chambers at opposite faces of said elastic central portion of said diaphragm and said chambers communicating with respective ones of said passages whereby fluids under pressure admitted to respective ones of said chambers by way of said passages exert respective forces against respective faces of said elastic central portion of said diaphragm to flex the latter to extents depending upon the differences between the respectives forces; and
third means, including first and second variable-reluctance electromagnetic units each disposed in a respective one of the recesses in said body members and disposed with the magnetic circuits thereof including at least a portion of said elastic paramagnetic central portion of said diaphragm device whereby the reluctance of the magnetic circuits vary in response to flexing of the central portion of the diaphragm device, said magnetic units comprising respective primary winding means and respective secondary means and electrical leads thereto, and said units being sealed in respective ones of said recesses, whereby transduction of fluid pressure variations to which said diaphragm device may be subjected is accomplished without radial movement of any of said annular rim portions of said diaphragm device whereby linearity error due to such radial movement in said transduction is avoided.

References Cited

UNITED STATES PATENTS

| Re. 19,443 | 1/1935 | DeVito | 92—101 |
|---|---|---|---|
| 2,551,489 | 5/1951 | Eichmann | 92—101 |
| 2,641,742 | 6/1953 | Wolfe et al. | |
| 2,683,989 | 7/1954 | Clark | 73—398 |
| 3,106,095 | 10/1963 | Travis. | |
| 3,124,959 | 3/1964 | Pall et al. | 73—407 |

DAVID SCHONBERG, *Primary Examiner.*

LOUIS R. PRINCE, *Examiner.*

D. O. WOODIEL, *Assistant Examiner.*